United States Patent
Lee et al.

(10) Patent No.: US 10,608,925 B2
(45) Date of Patent: Mar. 31, 2020

(54) PACKET TRANSMISSION METHOD PERFORMED BY NODE IN WIRELESS COMMUNICATION SYSTEM AND TERMINAL USING SAID METHOD

(71) Applicants: LG ELECTRONICS INC., Seoul (KR); SEOUL NATIONAL UNIVERSITY R&DB FOUNDATION, Seoul (KR)

(72) Inventors: Seungmin Lee, Seoul (KR); Dae Ho Kang, Seoul (KR); Seungbeom Jeong, Seoul (KR); Sae Woong Bahk, Seoul (KR); Chang Hee Joo, Seoul (KR)

(73) Assignees: LG ELECTRONICS INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/060,245

(22) PCT Filed: Dec. 8, 2016

(86) PCT No.: PCT/KR2016/014390
§ 371 (c)(1),
(2) Date: Jun. 7, 2018

(87) PCT Pub. No.: WO2017/099498
PCT Pub. Date: Jun. 15, 2017

(65) Prior Publication Data
US 2018/0375756 A1  Dec. 27, 2018

Related U.S. Application Data

(60) Provisional application No. 62/264,331, filed on Dec. 8, 2015.

(51) Int. Cl.
*H04L 12/733* (2013.01)
*H04L 12/801* (2013.01)
(Continued)

(52) U.S. Cl.
CPC .............. *H04L 45/20* (2013.01); *H04L 47/17* (2013.01); *H04W 4/70* (2018.02); *H04W 4/80* (2018.02);
(Continued)

(58) Field of Classification Search
CPC ........ H04L 45/20; H04L 47/17; H04W 8/005; H04W 4/70; H04W 76/27; H04W 88/16; H04W 4/40
See application file for complete search history.

(56) References Cited

U.S. PATENT DOCUMENTS 8,787,388 B1 * 7/2014 Adams ................... H04L 45/38
370/244
2005/0265356 A1 * 12/2005 Kawarai ............. H04L 12/4641
370/395.53
(Continued)

FOREIGN PATENT DOCUMENTS

KR  10-2009-0124899 A   12/2009
KR  10-2012-0067883 A    6/2012
(Continued)

*Primary Examiner* — Yemane Mesfin
*Assistant Examiner* — Henry Baron
(74) *Attorney, Agent, or Firm* — Birch, Stewart, Kolasch & Birch, LLP

(57) ABSTRACT

The present invention provides a method for forwarding an uplink packet performed by a node in a wireless communication system, the method being characterized in that the uplink packet including a first cost is received, the first cost is compared with a second cost corresponding to a cost of the node to determine whether to forward the uplink packet, and on the basis of the determination the uplink packet is forwarded, the node forwards the uplink packet when a
(Continued)

value of the second cost is smaller than a value of the first cost, and the node does not forward the uplink packet when the second cost value is not smaller than the first cost value.

2 Claims, 20 Drawing Sheets

(51) Int. Cl.
    *H04W 8/00*     (2009.01)
    *H04W 4/40*     (2018.01)
    *H04W 4/70*     (2018.01)
    *H04W 76/27*     (2018.01)
    *H04W 88/16*     (2009.01)
    *H04W 4/80*     (2018.01)
    *H04W 80/02*     (2009.01)
    *H04W 88/04*     (2009.01)
    *H04W 48/12*     (2009.01)

(52) U.S. Cl.
    CPC .............. *H04W 76/27* (2018.02); *H04W 4/40* (2018.02); *H04W 8/005* (2013.01); *H04W 48/12* (2013.01); *H04W 80/02* (2013.01); *H04W 88/04* (2013.01); *H04W 88/16* (2013.01)

(56) References Cited

U.S. PATENT DOCUMENTS

| 2008/0004024 | A1* | 1/2008 | Puri ...................... H04W 48/18 |
| | | | 455/436 |
| 2009/0303977 | A1* | 12/2009 | Hsu ....................... H04L 1/0007 |
| | | | 370/345 |
| 2010/0260071 | A1* | 10/2010 | Lai .......................... H04L 45/22 |
| | | | 370/256 |
| 2012/0207253 | A1* | 8/2012 | Park ...................... H04L 25/022 |
| | | | 375/343 |
| 2013/0208718 | A1 | 8/2013 | Ashwood-Smith |

FOREIGN PATENT DOCUMENTS

| KR | 10-2012-0092270 A | 8/2012 |
| KR | 10-2014-0052847 A | 5/2014 |

* cited by examiner

PACKET TRANSMISSION METHOD PERFORMED BY NODE IN WIRELESS COMMUNICATION SYSTEM AND TERMINAL USING SAID METHOD

CROSS REFERENCE TO RELATED APPLICATIONS

This application is the National Phase of PCT International Application No. PCT/KR2016/014390, filed on Dec. 8, 2016, which claims priority under 35 U.S.C. 119(e) to U.S. Provisional Application No. 62/264,331, filed on Dec. 8, 2015, all of which are hereby expressly incorporated by reference into the present application.

BACKGROUND OF THE INVENTION

Field of the Invention

The present invention relates to wireless communication and, more particularly, to a packet-transmission method performed by a node in a wireless communication system and a user equipment (UE) using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, there has been a growing interest in D2D (Device-to-Device) technology for direct communication between devices. In particular, D2D is attracting attention as a communication technology for the public safety network. Commercial communication networks are rapidly changing to LTE, but current public safety networks are mainly based on 2G technology in terms of conflicts with existing communication standards and cost. These technological gaps and demands for improved services have led to efforts to improve public safety networks.

Public safety networks have higher service requirements (reliability and security) than commercial communication networks and require direct signal transmission and reception, or D2D operation, between devices, especially when the coverage of cellular communications is insufficient or unavailable.

For example, D2D operation in general can have a variety of advantages in that it transmits and receives signals between nearby devices. For example, the D2D UE has high data rate and low delay and is capable of data communication. Also, the D2D operation can disperse the traffic to the base station, and can also expand the coverage of the base station if the UE performing the D2D operation acts as a repeater. Communication related to a vehicle, including transmission and reception of signals between vehicles with the above-mentioned extension of D2D communication, is called V2X (VEHICLE-TO-X) communication in particular.

On a multi-hop wireless access network architecture, when a UE transmits a packet using D2D communication, it is important to determine the route through which the packet will be efficiently transmitted. However, according to the prior art, when a packet is transmitted, a problem occurs that it takes a comparatively long time to determine the route to which the packet is to be transmitted.

Accordingly, the present invention provides a method for efficiently determining a route for transmitting a packet on a multi-hop wireless access network and transmitting an uplink packet or a downlink packet based on the determined route.

SUMMARY OF THE INVENTION

The present invention provides a packet-transmission method performed by a user equipment (UE) in a wireless communication system and a UE using the same.

In an aspect, a method for forwarding an uplink packet, performed by a node, in a wireless communication system is provided. The method may comprise receiving the uplink packet including a first cost, determining whether to forward the uplink packet by comparing the first cost with a second cost corresponding to a cost of the node, and forwarding the uplink packet based on the determination. If a value of the second cost is smaller than a value of the first cost, the node forwards the uplink packet and if the value of the second cost is not smaller than the value of the first cost, the node may not forward the uplink packet.

The second cost may be determined based on a subcarrier index value of a tone signal transmitted to the node.

The second cost may be determined based on the subcarrier index value and a signal-to-noise ratio of the tone signal.

The value of the second cost when the signal-to-noise ratio of the tone signal is greater than a preset threshold value may be greater than the value of the second cost when the signal-to-noise ratio of the tone signal is not greater than the preset threshold.

The value of the second cost when the signal-to-noise ratio of the tone signal is greater than the predetermined threshold value may be determined by an equation:

$$C_A = (i-1) \times SNR_{THRES} + 1,$$

Here, the $C_A$ may a value of the determined second cost, i may be an index value of the subcarrier, and $SNR_{THRES}$ may be the predetermined threshold value.

The value of the second cost when the signal-to-noise ratio of the tone signal is not greater than the predetermined threshold value may be determined by an equation:

$$C_A = (i-1) \times SNR_{THRES} + [SNR_{THRES} + 1 - SNR_{TONE}],$$

The $C_A$ may be a value of the determined second cost, i may be an index value of the subcarrier, and $SNR_{THRES}$ may be the preset threshold value.

The uplink packet may further include information on a maximum number of nodes through which the uplink packet may be forwarded.

The node may be a user equipment (UE) supporting device to device (D2D) operation or vehicle to X (V2X) operation.

In another aspect, a user equipment (UE) is provided. The UE may comprise a radio frequency (RF) unit configured to transmit and receive a wireless signal, and a processor coupled with the RF unit. The processor may be configured to receive an uplink packet including a first cost, determine whether to forward the uplink packet by comparing the first cost with a second cost corresponding to the cost of the UE, and forward the uplink packet based on the determination. If a value of the second cost is smaller than a value of the first cost, the UE may forward the uplink packet and if the value of the second cost is not smaller than the value of the first cost, the UE does not forward the uplink packet.

In other aspect, a method for forwarding a downlink packet, performed by a first node, in a wireless communication system may be provided. The method may comprise receiving a downlink packet whose destination is a second node, determining whether to forward the downlink packet based on uplink transmission record information of the first node and a cost of the first node, and forwarding the downlink packet based on the determination.

At least one node that has transmitted a uplink packet to the first node may be recorded in the uplink transmission recording information of the first node.

When the second node is recorded in the uplink transmission record information of the first node, the first node may decide to forward the downlink packet.

When deciding to forward the downlink packet, the first node may set the cost of the first node to the cost of the downlink packet.

The downlink packet further may include information on a maximum number of nodes through which the downlink packet may be forwarded.

The node may be a user equipment (UE) supporting device to device (D2D) operation or vehicle to X (V2X) operation.

According to the present invention, a packet transmission method performed by a UE in a wireless communication system and a UE using the same are provided.

According to the present invention, a method for calculating a cost used to transmit a packet is provided. In the present invention, a gradient routing technique optimized for a multi-hop wireless access network is proposed. Routing overhead is simplified by not generating a cost field with all nodes as destinations, but by generating only a cost field directed only to the gateway node. In addition, the cost field can be constructed within a short time by using the tone signal. The generated cost field can be utilized for uplink and downlink gradient routing. In particular, unnecessary retransmission is reduced by limiting the number of nodes participating in the downlink gradient routing through the uplink transmission recording of the mobile node.

DESCRIPTION OF EXEMPLARY EMBODIMENTS

Figure 1:
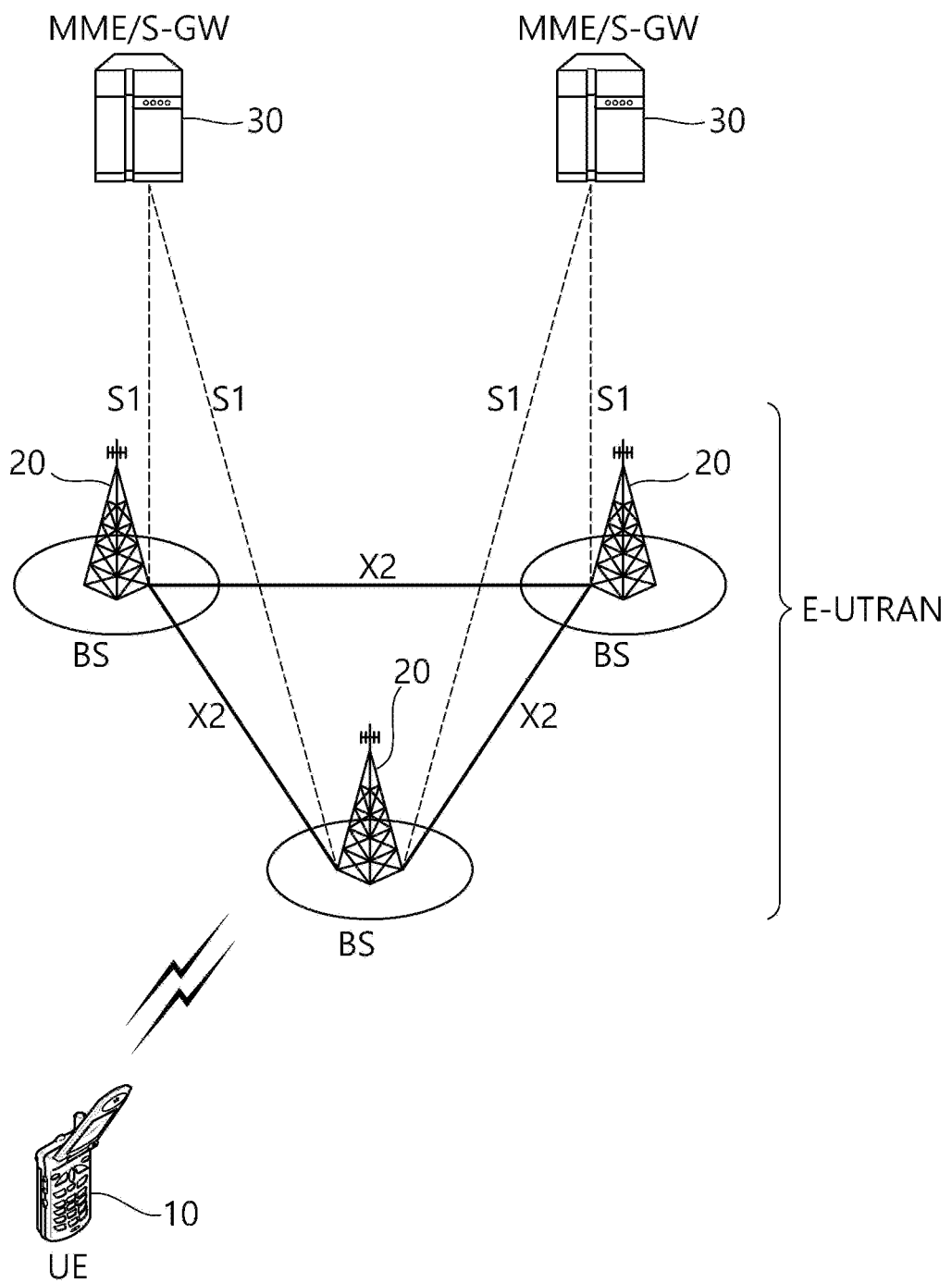
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
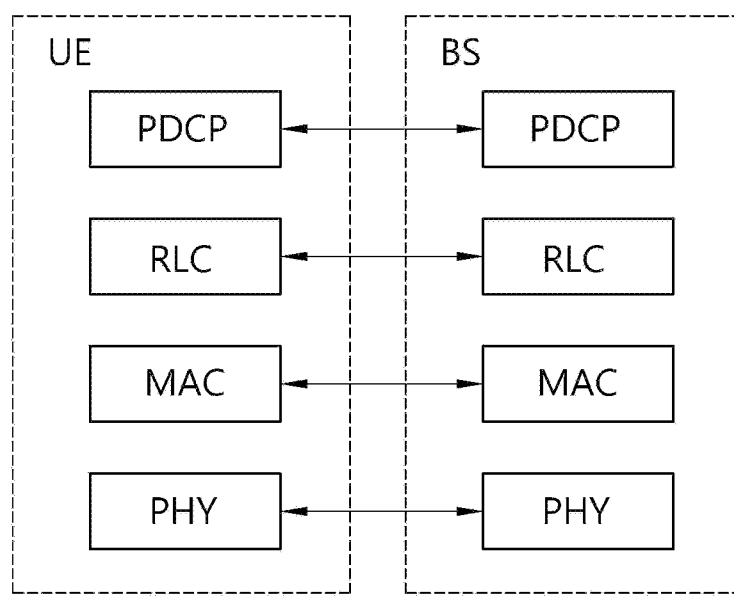
FIG. 2 is a diagram showing a wireless protocol architecture for a user plane.
Figure 3:
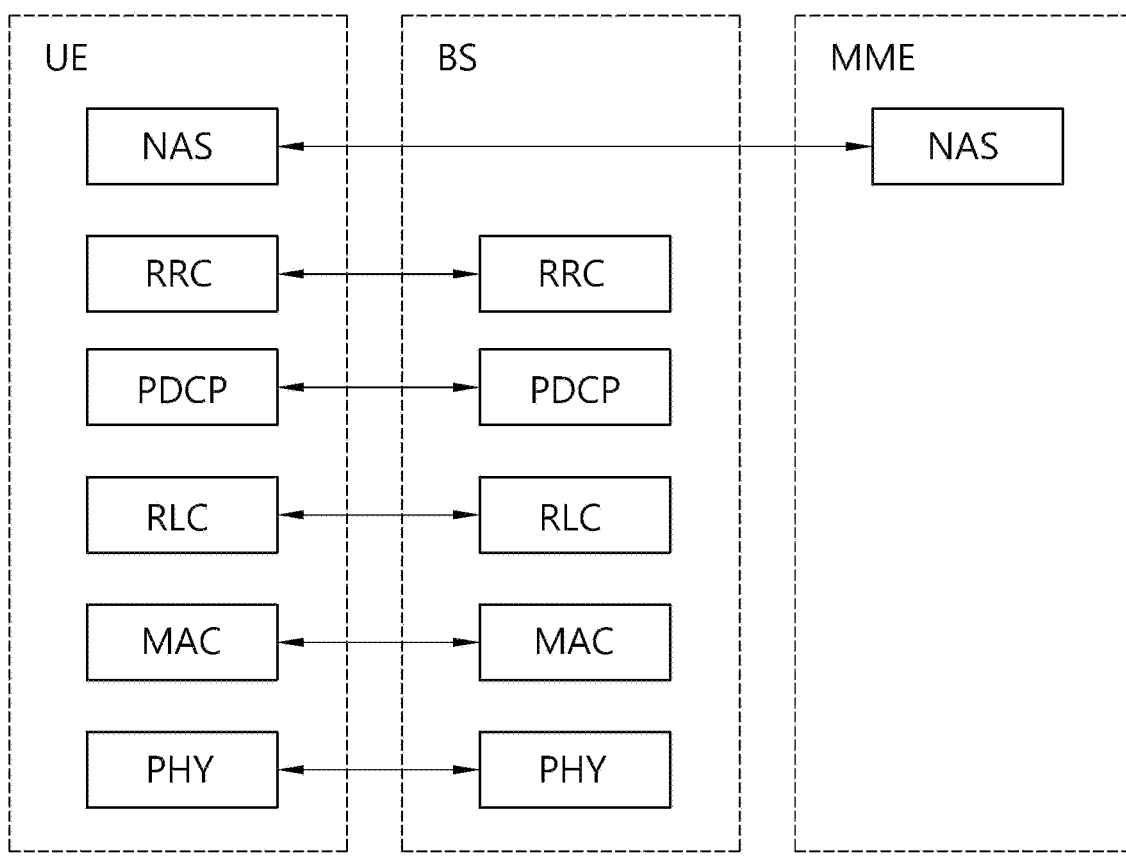
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 4:
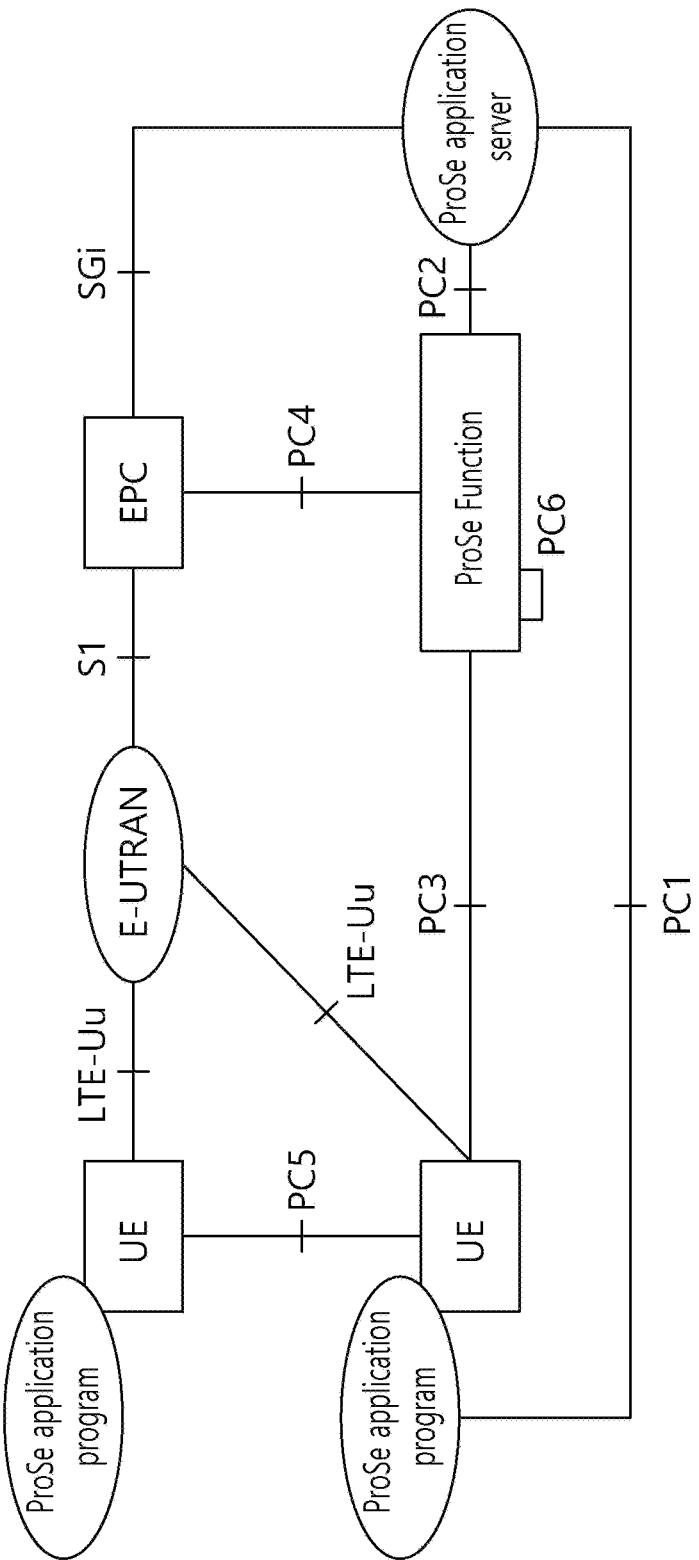
FIG. 4 illustrates a reference structure for a ProSe.

FIG. 4 illustrates a reference structure for a ProSe.

Referring to FIG. 4, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 5:
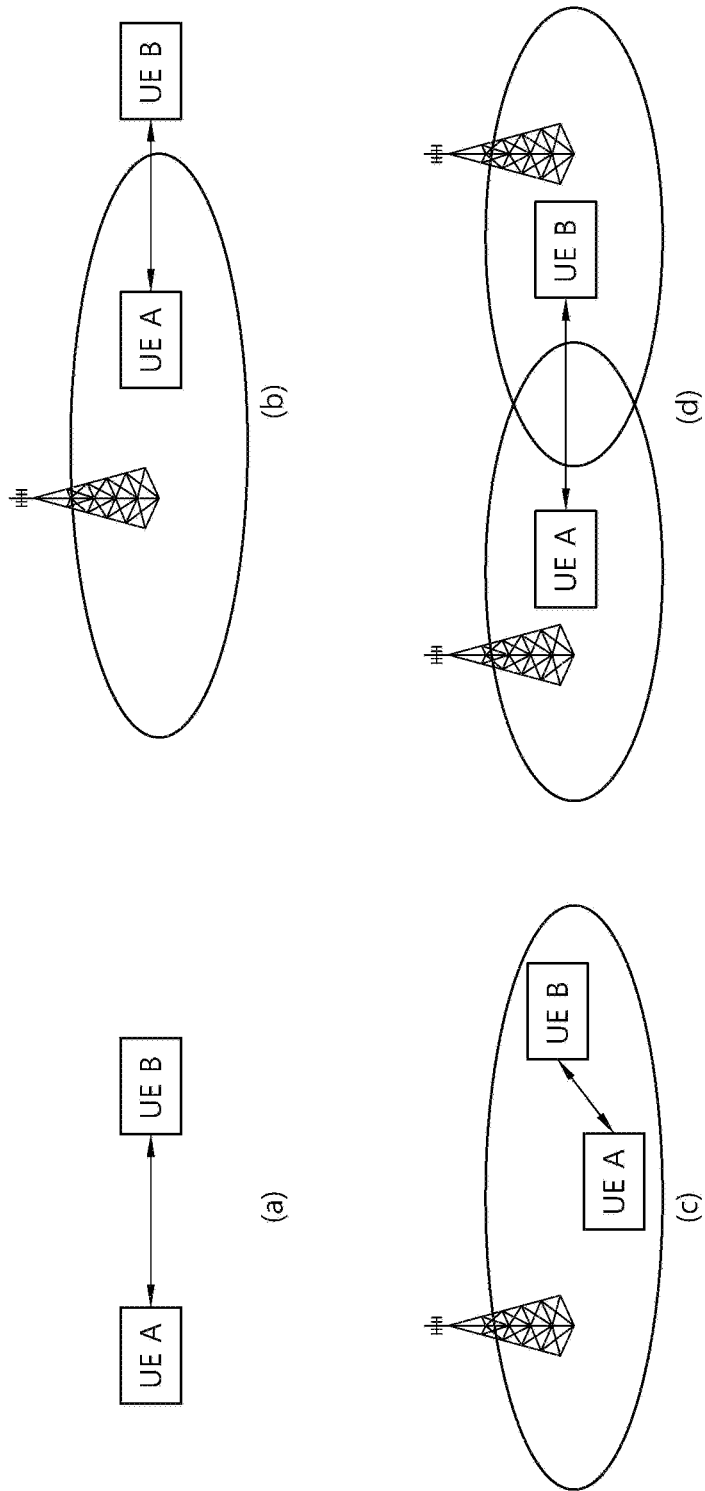
FIG. 5 illustrates arrangement examples of terminals performing ProSe direct communication and cell coverage.

FIG. 5 illustrates arrangement examples of terminals performing ProSe direct communication and cell coverage.

Referring to FIG. 5(a), UEs A and B may be located outside of the cell coverage. Referring to FIG. 5(b), the UE A may be located in the cell coverage and the UE B may be located outside of the cell coverage. Referring to FIG. 5(c), both of UEs A and B may be located in the cell coverage. Referring to FIG. 5(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 6:
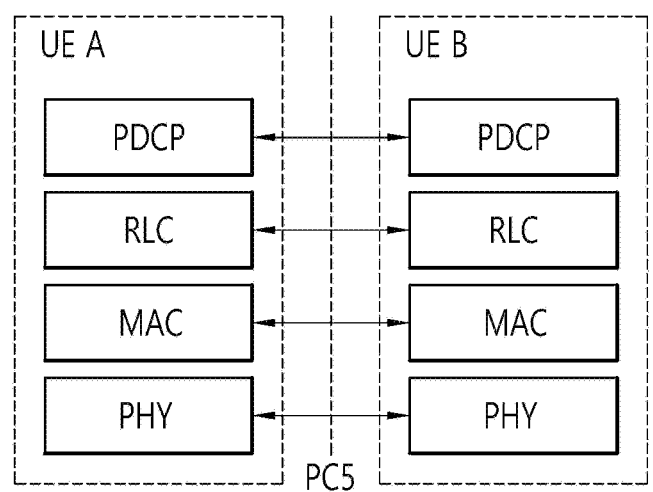
FIG. 6 illustrates a user plane protocol stack for the ProSe direct communication.

FIG. 6 illustrates a user plane protocol stack for the ProSe direct communication.

Referring to FIG. 6, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 7:
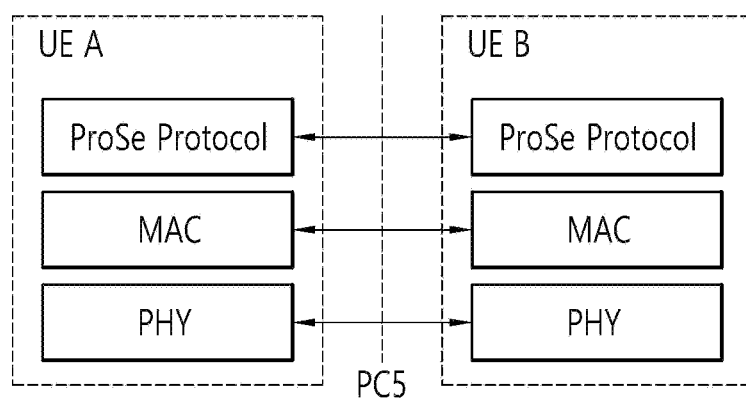
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Hereinafter, the present invention will be described.

In general, the D2D operation can have various advantages in that it transmits and receives signals between adjacent devices. For example, the D2D UE has high data rate and low delay and is capable of data communication. Also, the D2D operation can distribute traffic concentrated to the base station. If the UE performing the D2D operation serves as a repeater, the UE performing the D2D operation can also expand the coverage of the base station.

Communication related to a vehicle, including transmission and reception of signals between vehicles with the above-mentioned extension of D2D communication, is called V2X (VEHICLE-TO-X) communication in particular. Here, for example, the term "X" in V2X (VEHICLE-TO-X) refers to PEDESTRIAN (COMMUNICATION BETWEEN VEHICLE AND A DEVICE CARRIED BY AN INDIVIDUAL (e.g. HANDHELD UE CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND ROADSIDE UNIT (RSU)/NETWORK (e.g., RSU IS A TRANSPORTATION INFRASTRUCTURE ENTITY) (e.g. AN ENTITY TRANSMITTING SPEED NOTIFICATIONS) IMPLEMENTED IN AN eNB OR A STATIONARY UE)) (V2I/N). For example, for convenience of explanation of the proposed method, a device (related to V2P communication) owned by a pedestrian (or a person) is referred to as a "P-UE", a device installed in VEHICLE (related to V2X communication) "V-UE" Also, for example, in the present invention, the term "ENTITY" may be interpreted as P-UE and/or V-UE and/or RSU (/NETWORK/INFRASTRUCTURE).

Here, the above-described D2D operation (or V2X operation) can be applied to a multi-hop wireless access network. Hereinafter, a multi-hop wireless access network will be described in detail with reference to the drawings.

Figure 8:
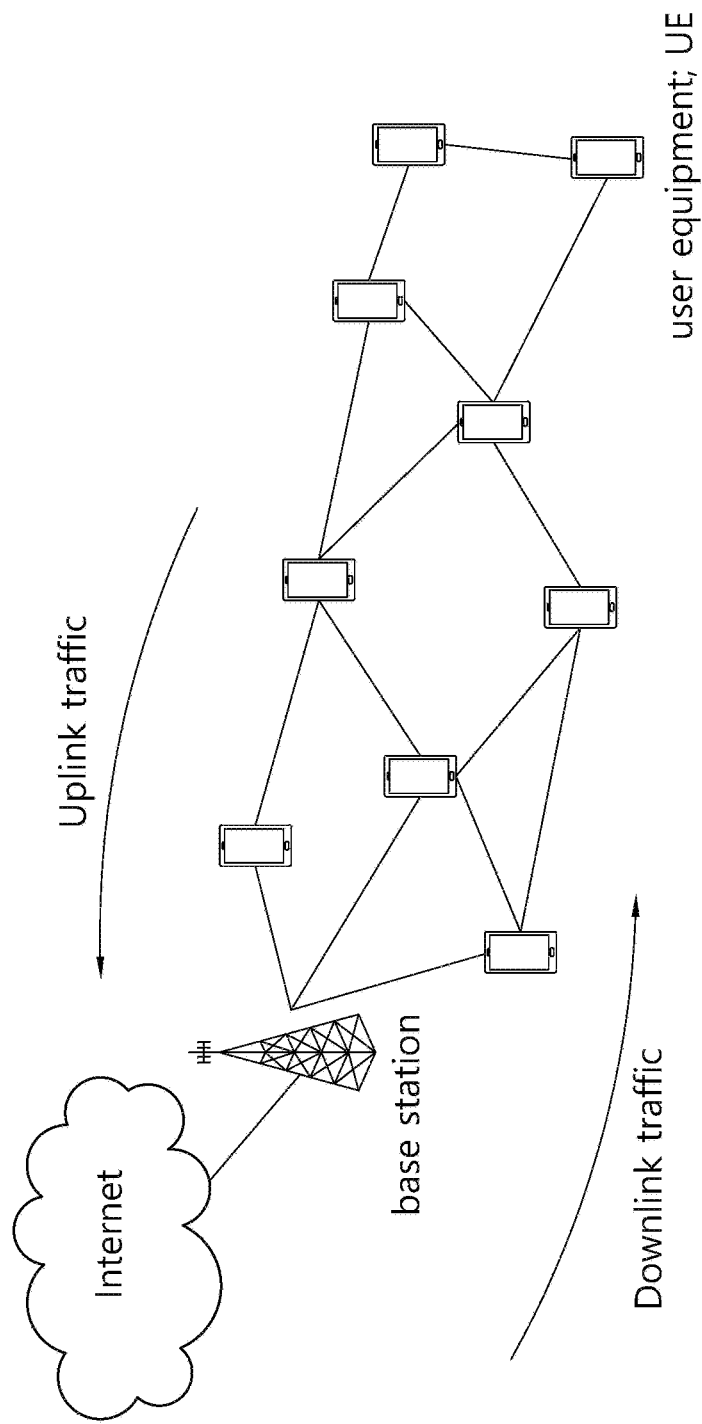
FIG. 8 schematically shows a multi-hop wireless access network structure.

FIG. 8 schematically shows a multi-hop wireless access network structure.

Referring to FIG. 8, the multi-hop wireless access network architecture may be composed of a base station, a gateway node, and a plurality of UEs, and the multi-hop wireless access network architecture may have a hierarchical network structure. Here, the gateway node is connected to the Internet, and provides a communication service to the UE through direct or multi-hop relay. Herein, the "hop" represents an aspect in which each packet passes through each node (or a router) in the data communication network, and the number of hops is determined by the number of nodes (or routers) through which the packet passes.

The direction of traffic in the network can be classified into downlink traffic and uplink traffic. First, downlink traffic means packet transmission from a gateway node to a UE, and uplink traffic can mean packet transmission from a UE to a gateway.

In summary, the multi-hop wireless access network is a network composed of one or a plurality of gateway nodes and a plurality of UEs, and is characterized in that network traffic is divided into an upward (UE ->gateway node) or a downward (gateway node ->UE). In this multi-hop wireless access network, forwarding downlink/uplink traffic to a destination without loss is very important in ensuring quality of service (QoS) of various applications.

As schemes for servicing uplink traffic and/or downlink traffic in a multi-hop wireless access network, 1. flooding scheme, 2. utilizing a separate routing protocol, and 3. gradient routing scheme may be used.

1. Flooding Scheme

A flooding scheme may be provided as a scheme for serving uplink/downlink traffic in a multi-hop wireless access network.

In this scheme, the traffic source broadcasts a packet corresponding to the uplink/downlink traffic to the wireless channel, and the node receiving the packet can confirm whether the packet is re-received. When the node first receives the packet, the node retransmits the packet once, and if the node does not receive the packet for the first time, the node may ignore the received packet.

According to this scheme, when a packet is actually delivered to a UE corresponding to an end UE, a large number of nodes that do not necessarily participate in packet transmission participates in forwarding, so that unnecessary radio channel resources and UE resources are consumed.

2. Scheme of Utilizing a Separate Routing Protocol

Alternatively, there is a scheme of constructing a tree-type network including gateways and UEs by utilizing separate routing protocols and then serving uplink/downlink traffic.

In this scheme, the gateway node and the UEs exchange predefined routing messages, and each UE can manage the information of the parent node towards the gate node and the child nodes connected to the UE. In addition, the gateway node can manage information of all child nodes connected to the gateway node. At this time, the uplink traffic can be transmitted by sequentially transmitting the packets to the respective parent nodes of the respective UEs. In addition, the downlink traffic can be delivered in a manner that the next hop node is determined based on the child node information of the gateway and the respective UEs.

According to this scheme, since packet forwarding is performed after the next-hop node (parent and/or child node) is set, when the network phase changes (due to node mobility, etc.), it has a disadvantage that it cannot cope with change of the network phase quickly.

3. Gradient Routing Scheme

According to this scheme, the nodes measure the cost value to the destination node through a separate control message exchange.

When a node actually transmits a packet, it does not set a next-hop node to the destination node, but loads a cost value to a destination recognized by the node itself in the packet header and transmits the packet to the wireless channel.

The nodes that receive the packet including the packet header compare their cost with the cost value in the packet. Only when the cost of the node itself (that is, the nodes receiving the packet) is smaller than the cost value included in the received packet, the received packet can be forwarded after a random backoff.

The nodes that have reserved the forwarding (i.e., the nodes that have decided to forward the received packet after random backoff) can cancel their forwarding reservation when receiving the same packet transmitted by the node having a cost lower than the cost value of the forwarding-reserved node before the random backoff expires.

For example, in the case that the cost value of the node that reserved the forwarding is "3", if receiving the same packet as the packet received by the node from a node having a cost value of "2", the node (i.e., forwarding-reserved node) can cancel its own forwarding reservation.

According to this scheme, since a plurality of neighboring UEs can participate in forwarding after a cost comparison, a path diversity gain may exist as compared with "a method using a separate routing protocol", and the rate of reaching the destination can be increased.

However, since nodes need to exchange control messages between nodes separately in order to calculate a cost to a destination, there may be a problem that radio resource usage increases.

Accordingly, the present invention provides I. a method and apparatus for calculating a cost from a node to a destination without exchanging control messages between nodes and II. a method of providing uplink/downlink traffic service based on the above-described routing scheme (in particular, a gradient routing scheme) based on the above-described cost, and an apparatus using the same.

It is assumed in the present invention that all nodes are equipped with an OFDM-based radio transceiver. The total number of data subcarriers is Ns, and the tone signal can be transmitted and detected for each subcarrier. Also, the situation the maximum hop distance between the gateway node and the mobile node is shorter than Ns is considered.

All nodes in the present invention may attempt channel access through CSMA/CA (Carrier Sense Multiple Access/Collision Avoidance). In CSMA/CA, each node can detect the channel before sending the packet. If the channel is empty by the length of the long inter-frame space (LIFS), it immediately starts packet transmission. Otherwise, it may attempt to retransmit the packet after backoff for an arbitrary time.

I. How to Calculate the Cost from Node to Destination

Figure 9:
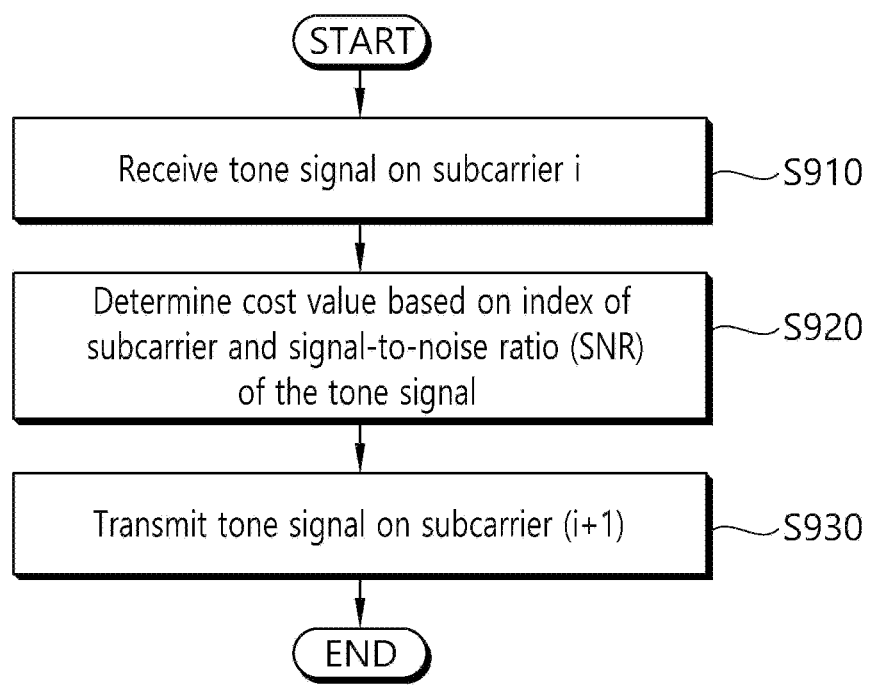
FIG. 9 is a flowchart of a cost update method according to an embodiment of the present invention.

FIG. 9 is a flowchart of a cost update method according to an embodiment of the present invention.

According to FIG. 9, the node (or UE) may receive the tone signal on subcarrier i (where i is a natural number) (S910). Here, the tone signal may mean a signal for detecting a state change of the transmission path. The tone signal corresponds to a sequence, and may correspond to a pilot signal or a reference signal. Here, the node may mean a UE, and in particular, the node may correspond to a D2D UE or a V2X UE. That is, the embodiment according to the present invention can be applied in the D2D operation or the V2X operation.

Thereafter, the node may determine the cost value based on the index of the subcarrier and the signal-to-noise ratio of the tone signal (S920). Here, the index number of the subcarrier may mean the value of "i" described above. A specific example of determining the cost based on the signal-to-noise ratio of the tone signal and the number of the subcarriers on which the tone signal is received will be described later.

The node may transmit the tone signal on the (i+1)th subcarrier (S930).

The above-mentioned method of transmitting the tone signal on different subcarriers when the node calculates the cost will be described with reference to the drawings for convenience of understanding.

Figure 10:
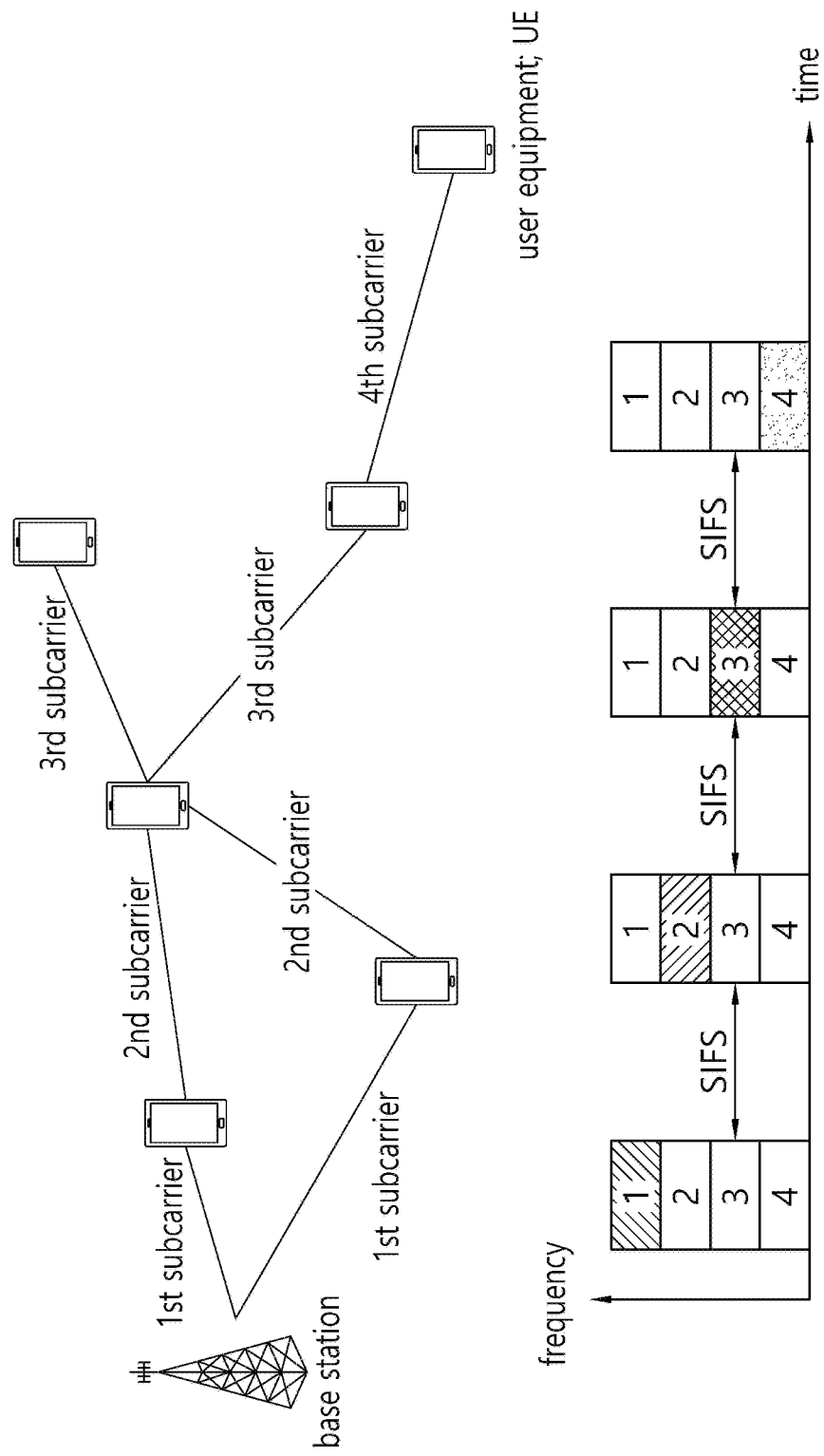
FIG. 10 schematically shows an example of a method for transmitting a tone signal on different subcarriers, according to an embodiment of the present invention.

FIG. 10 schematically shows an example of a method for transmitting a tone signal on different subcarriers, according to an embodiment of the present invention.

According to FIG. 10, the base station can transmit a tone signal on the first subcarrier. Subsequently, the UE receiving the tone signal transmitted on the first subcarrier may transmit the tone signal on the second subcarrier after the Short Inter-Frame Space (SIFS). Subsequently, the UE receiving the tone signal transmitted on the second subcarrier may transmit the tone signal on the third subcarrier. Similarly, a UE receiving a tone signal transmitted on a third subcarrier may transmit a tone signal on a fourth subcarrier.

Likewise, each time a node (particularly a UE) transmits a tone signal, it transmits a tone signal on a subcarrier other than the subcarrier on which the tone signal was previously transmitted. If the hop count between the gateway node and the mobile node (i.e., the UE) is equal to or greater than the number of subcarriers allocated to the node, the node transmits the tone signal on the subcarrier on which the tone signal was transmitted, which may cause a problem that the tone signal having been transmitted to the transmitter is overlapped with the tone signal transmitted newly.

Accordingly, as described above, the present invention can be applied when the maximum hop distance between the gateway node and the mobile node is shorter than Ns in the case that the total number of data subcarriers is Ns.

As described above, since the UE can transmit the tone signal cyclically on different subcarriers, the tone signal transmitted by the UE may overlap. Accordingly, in order to solve the above-mentioned problem and prevent the tone signal from being transmitted in the reverse direction, the UE may compare the value of the subcarrier index of the received tone signal (i.e., the value of i) with the value of the subcarrier index of the UE itself (or which is set to the UE itself).

Although not shown in separate drawings, the method of comparing, by the UE, the subcarrier index of the received tone signal and the index of the UE (or the index set for the UE; here, the index set for the UE may be the index of the subcarrier that the UE has previously forwarded).

First, the UE can compare the subcarrier index of the tone signal with the index of the UE.

At this time, if the value of the subcarrier index of the tone signal received by the UE is greater than (optionally, greater than or equal to) the index value of the UE, the tone signal may be transmitted in the reverse direction and received by the UE. If the tone signal received by the UE is transmitted in the reverse direction, the UE does not need to forward the tone signal any more, so the UE may not forward the tone signal.

If the value of the subcarrier index of the tone signal received by the UE is not greater than (optionally, smaller than) the index value of the UE, the tone signal may be transmitted in the forward direction and received by the UE. Accordingly, the UE can forward the tone signal.

The method of comparing the subcarrier index of the tone signal with the index of the UE may be applied to an uplink traffic service and/or a downlink traffic service, which will be described later.

The above-described specific example of determining the cost based on the signal-to-noise ratio of the tone signal and the number of the subcarriers on which the tone signal is received may be as follows.

Figure 11:
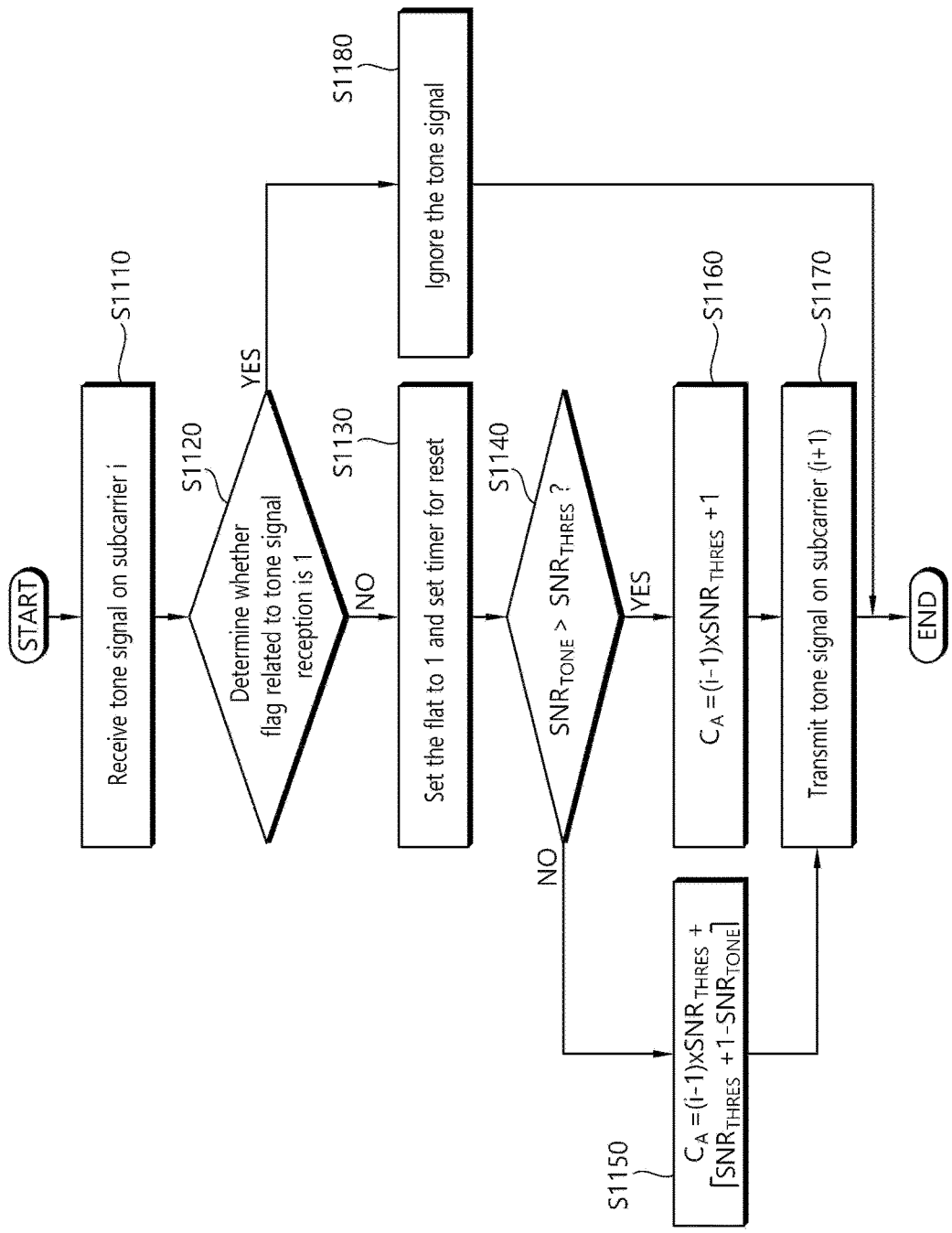
FIG. 11 is a flowchart of a cost update method according to another embodiment of the present invention.

FIG. 11 is a flowchart of a cost update method according to another embodiment of the present invention.

The node (or UE) may receive the tone signal on subcarrier i (S1110). As described above, the node herein may mean a UE, and in particular, the node may correspond to a D2D UE or a V2X UE. That is, the embodiment according to the present invention can be applied in the D2D operation or the V2X operation.

For example, if a gateway node transmits a tone signal on a first subcarrier of a Ns subcarrier periodically for a short period of time ($T_{TONE}$) and the node receives a tone signal transmitted by a gateway node (i.e., when receiving a tone signal from the gateway node), the node may receive the tone signal on the first (i=1) th subcarrier.

Thereafter, the node may then determine whether the information indicating whether the node has received the tone signal indicates that it has received the tone signal (S1120).

The information indicating whether or not the node has received the tone signal may also be referred to as a "flag relating to the reception of a tone signal", which may be named "ToneRxFlag". At this time, when the value of "ToneRxFlag" is "1", "ToneRxFlag" may indicate that the tone signal is received. In addition, when the value of "ToneRxFlag" is "0" or the value of "ToneRxFlag" is not defined, the "ToneRxFlag" can indicate that no tone signal has been received.

(Alternatively, if "ToneRxFlag" is "0", "ToneRxFlag" may indicate that a tone signal has been received. Alternatively, if the value of "ToneRxFlag" is "1" or if the value of "ToneRxFlag" is not defined, the "ToneRxFlag" may indicate that the tone signal has not been received.)

If the information indicating whether the tone signal has been received indicates that the tone signal has been received, the node may ignore the tone signal (S1180).

Indicating that the information indicating whether or not the tone signal has been received indicates that the tone signal has been received means that the value of "ToneRxFlag" is "1" as described above. Here, ignoring the tone signal may mean that the node does not transmit a new tone signal despite receiving the tone signal.

If the information indicating whether or not the tone signal has been received indicates that the tone signal has not been received, the node may set information indicating whether or not the tone signal has been received to indicate that the tone signal has been received. In addition, the node may set a timer for resetting information indicating whether or not the tone signal has been received together with the above setting (S1130).

Here, setting the information indicating whether the tone signal has been received to indicate that the tone signal has been received may mean setting the value of "ToneRxFlag" to "1". The timer for resetting the information indicating whether the tone signal has been received may have a value of "$T_{REFRESH}$". According to the timer, "ToneRxFlag" set to "1" may be set to "0" after "$T_{REFRESH}$".

The node may then determine (or update) the cost to the gateway node based on the SNR (Signal to Noise Ratio) value measured while receiving the tone signal.

More specifically, the node compares the SNR value of the tone signal with a predetermined threshold value (e.g., $SNR_{THRES}$) to determine whether the SNR value of the tone signal is greater than a predetermined threshold value (alternatively, whether it is abnormal) (S1140).

If the SNR value ($SNR_{ToNE}$) of the measured tone signal is greater than $SNR_{THRES}$ (alternatively, if it is abnormal), the node calculates a cost ($C_A$) directed to the gateway as shown in Equation 1 below (S1160).

$$C_A = (i-1) \times SNR_{THRES} + 1 \qquad \text{[Equation 1]}$$

If the SNR value $SNR_{TONE}$ of the measured tone signal is smaller than (alternatively, equal to or smaller than) $SNR_{THRES}$, the node calculates a cost ($C_A$) directed to the gateway according to Equation 2 below (S1150).

$$C_A = (i-1) \times SNR_{THRES} + [SNR_{THRES} + 1 - SNR_{TONE}] \qquad \text{Equation 2}$$

The above-described equation 2 can also be expressed by the following equation 3.

$$C_A = (i-1) \times SNR_{THRES} + [SNR_{THRES} - SNR_{TONE}] + 1 \qquad \text{Equation 3}$$

In Equation 1, Equation 2, and Equation 3, the first part, i.e., "$(i-1)*SNR_{THRES}$", denotes an offset cost reflecting the topological distance between the gateway node and the node. Here, when relaying the tone signal (i.e., when the node receives a tone signal on subcarrier i and transmits a tone signal on subcarrier i+1), the subcarrier index increases, and thus the node may regard the subcarrier index as the number of hops from the gateway node. Accordingly, the subcarrier index i can be included in the offset cost of the $C_A$.

The second part of Equations 1, 2 and 3, i.e. the part other than the first part, represents the quality of the link between the node and the tone signal transmission node (i.e., the node that transmitted the tone signal on subcarrier i).

If the node senses a high tone signal, the node knows that it has a reliable forwarding candidate node for uplink unicast as shown in Equation 1, and can simply add I to the $C_A$.

If the node senses a tone signal that is not high, the node may increase $C_A$ as shown in Equation 2 or Equation 3.

After the node updates the $C_A$ as described above, it may transmit the tone signal on the (i+1)th subframe (S1170). At this time, the node can transmit the tone signal on the (i+1)th subframe after the short inter-frame space (SIFS).

Thus, when the node of the present invention senses a tone signal on the i-th subcarrier, the node updates the cost toward the gateway, sets ToneRxFlag, and transmits the tone signal on the (i+1)th subcarrier.

As described above, the primary purpose of using cost updates based on tone signals is a reduction in communication overhead. After detecting the i-th tone signal, a plurality of nodes transmit tone signals to (i+1)th subcarriers simultaneously without backoff. Hence, all the tone signal transmissions occupy the channel for only a short time of "$T_{TONE}$+SIFS", and the quick signal update can be performed while the tone signal transmission is performed.

Additionally, if tone signals based on cost updates are in progress, reliability of tone signal based cost updates can be increased by restricting the transmission of nodes.

Suppose a node senses a tone signal at subcarrier i at time t. If the node knows the tone signal generation period, i.e., $T_{TG}$, the transmission start time of the next tone signal, t(next), can be predicted as shown in equation 4.

$$t(\text{next}) = t + T_{TG} - i \times (T_{TONE} + \text{SIFS}) \quad \text{Equation 4}$$

Therefore, if the transmission of the mobile node is suppressed from t(next) to t(next)+Ns×($T_{TONE}$+SIFS), the cost update can be done without interference from the data transmission. Here, Ns×($T_{TONE}$+SIFS) represents the maximum time required for the cost update process.

Hereinafter, a method of servicing uplink traffic and a method of servicing downlink traffic will be described based on the cost determined through the above-described method. That is, the cost determined through the above-described method can be applied to the embodiments described below.

II. A Method of Servicing Uplink and/or Downlink Traffic Based on the Above-mentioned Cost The cost determined in the manner described above can be used directly to transmit uplink traffic. When transmitting the uplink packet, a cost field directed to a gateway node may be used in utilizing the above-described routing method. Herein, as described above, the cost field may be determined by sequentially relaying a tone signal to subcarriers independent from one another.

That is, in the present invention, each node (i.e., a UE) constructs a cost field to a gateway node by relaying a tone signal in different subcarriers. In uplink routing, the cost can be used directly for uplink packet forwarding determination and cancellation. Hereinafter, a method in which the cost is directly used when serving uplink traffic will be described in more detail.

1. How to Service Uplink Traffic

Figure 12:
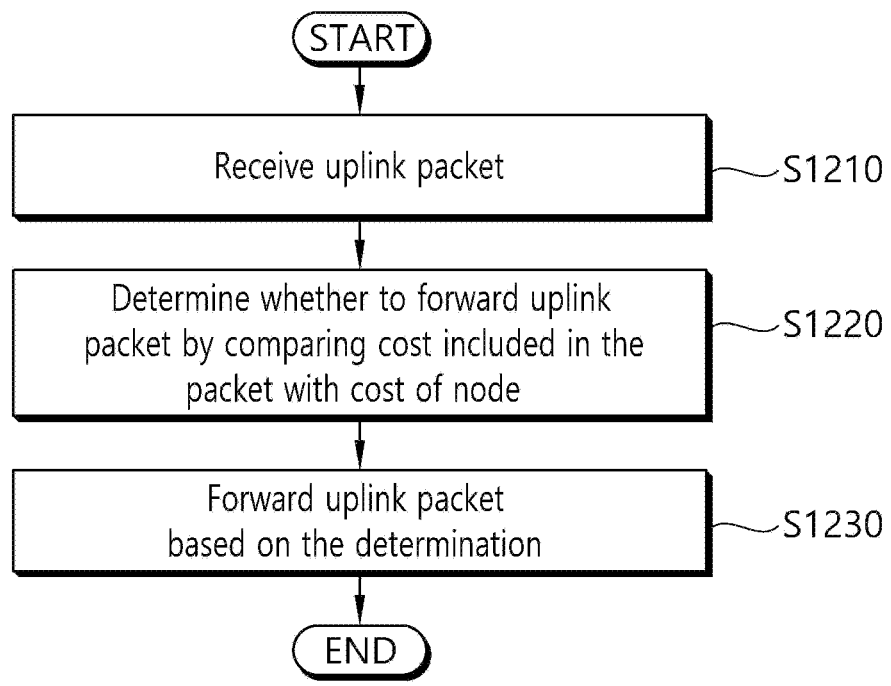
FIG. 12 is a flowchart of an uplink traffic transmission method according to an embodiment of the present invention.

FIG. 12 is a flowchart of an uplink traffic transmission method according to an embodiment of the present invention.

The node may receive the uplink packet (S1210). As described above, the node herein may mean a UE, and in particular, the node may correspond to a D2D UE or a V2X UE. That is, the embodiment according to the present invention can be applied in the D2D operation or the V2X operation.

When the node receives the uplink packet, the node can receive the cost field containing the cost determined by the above. Here, the cost field may be included in the uplink packet.

The cost included in the uplink packet may mean the cost of the node that transmitted the uplink packet. For convenience of explanation, for example, the node that transmitted the uplink packet may be referred to as a first node, and the cost of one node can be called the first cost.

Here, the first cost may be determined through the above-described cost determination method. In other words, the first cost may be determined based on a subcarrier index (i) in which a tone signal received by the first node is transmitted and SNR of the tone signal received by the first node.

For example, the first cost may be determined by comparing the SNR value of the tone signal received by the first node with a threshold value. At this time, if the SNR value of the tone signal received by the first node is greater than the threshold value, the value of the first cost may be smaller than when the SNR value of the tone signal received by the first node is equal to or smaller than the threshold value. Further, as described above, the first cost may be determined by further considering a flag related to the reception of the tone signal (e.g., "ToneRxFlag").

The node may compare the cost included in the packet with the cost of the node to determine whether to forward the uplink packet (S1220).

As described above, after the node compares the cost of the node itself with the cost included in the packet received by the node, only if the cost of the node itself is smaller than (optionally, smaller than or equal to) the cost included in the received packet, the received packet may be forwarded. Here, the forwarding of the packet may be performed after random backoff.

In addition, if the cost of the node itself is greater than (optionally, greater than or equal to) the cost included in the received packet, it may not forward the received packet.

For convenience of explanation, for example, the node (i.e., the node that received the uplink packet from the first node) may be referred to as a second node, and the cost of the second node may be referred to as a second cost.

Here, the second cost can be determined through the above-described cost determination method. In other words, the second cost may be determined based on a subcarrier index (i) in which the tone signal received by the second node is transmitted and the SNR of the tone signal received by the second node.

For example, the second cost may be determined by comparing the SNR value of the tone signal received by the second node with a threshold value. At this time, if the SNR value of the tone signal received by the second node is greater than the threshold value, the value of the second cost may have a value smaller than when the SNR value of the tone signal received by the second node is equal to or smaller than the threshold value. Further, as described above, the second cost can be determined by further considering a flag related to the reception of the tone signal (e.g., "ToneRxFlag").

Thereafter, the node may forward the uplink packet based on the determination (S1230).

For example, the node transmitting the uplink packet is referred to as a first node, the cost of the first node is referred to as a first cost, the node receiving the uplink packet is referred to as a second node and the cost of the second node is called the second cost.

Here, the second node can receive the uplink packet from the first node, and the second node can compare the first cost with the second cost. If the value of the second cost is smaller than the first cost, the second node forwards the uplink packet. If the value of the second cost is not smaller than the first cost, the second node may not forward the uplink packet.

As described above, when the uplink traffic is served, the cost determined as described above is directly used for the uplink traffic service. However, in the case of downlink traffic service, it is unclear how the cost will be used in using the above-described routing method as it is.

Accordingly, the present invention proposes a downlink scheme for reducing communication overhead for cost management.

If the node receives the uplink data packet, it caches the source node of the packet (i.e., the node that transmitted the uplink packet) to the uplink history table (UHT). Additionally, if the node does not receive any uplink packets from the cached node for a predetermined time (e.g., $T_{VALID}$), the cache information may be discarded.

The main idea applied to the downlink scheme for cost management according to the present invention is that only the node having the record of the uplink packet reception is set as the forwarding candidate of the downlink routing. That is, when the node transmits the downlink packet, only the node that has transmitted the uplink packet to the node that tries to transmit the downlink packet is set as the forwarding candidate of the downlink routing.

2. How to Service Downlink Traffic

Hereinafter, for convenience of explanation, a method of servicing downlink traffic will be described through 1) a method in which a gateway node transmits a downlink packet and 2) a method in which a node (e.g., a UE, in particular, a D2D UE or a V2X UE) services downlink traffic.

1) How the Gateway Node Transmits the Downlink Packet

Figure 13:
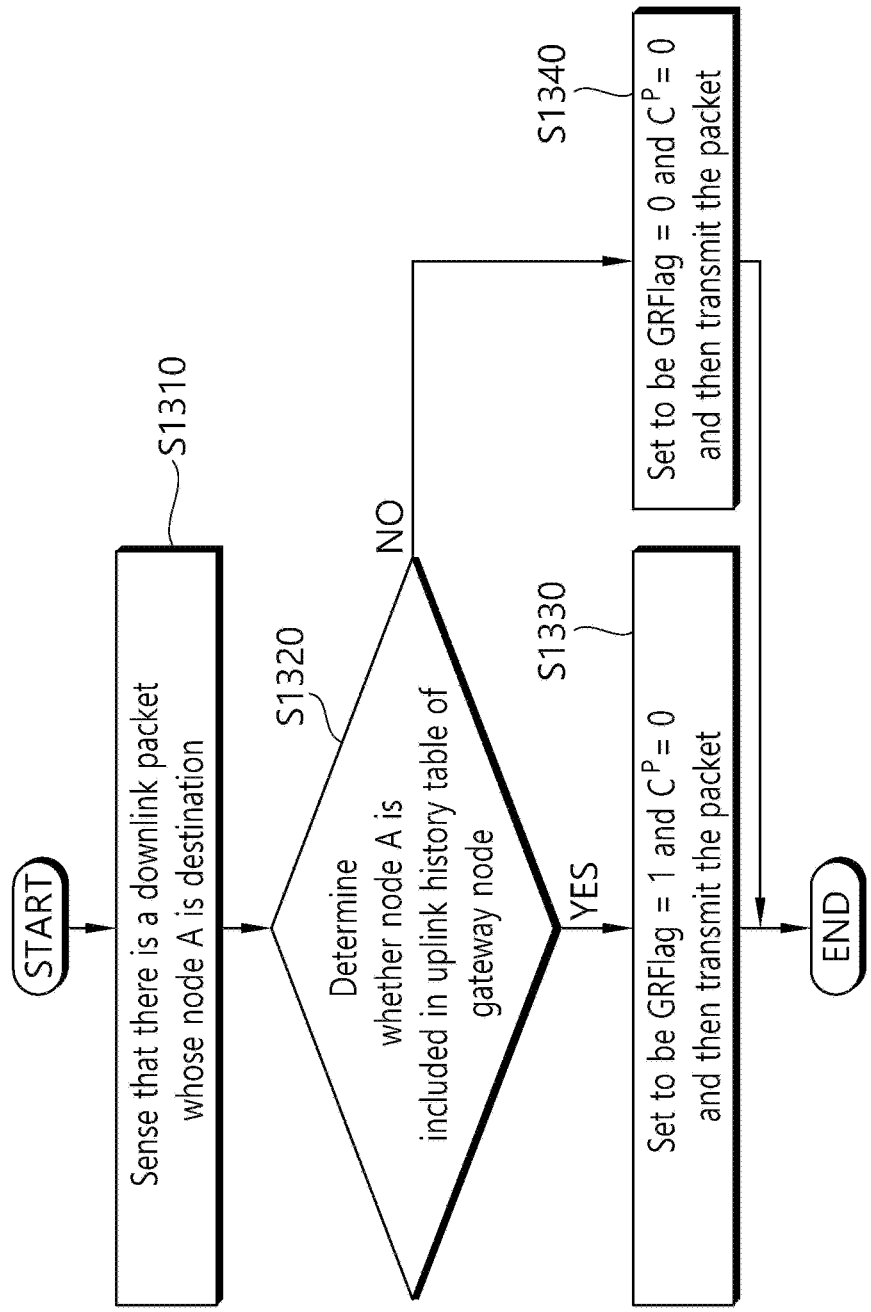
FIG. 13 is a flowchart of a method of transmitting a downlink packet performed by a gateway node according to an embodiment of the present invention.

FIG. 13 is a flowchart of a method of transmitting a downlink packet performed by a gateway node according to an embodiment of the present invention.

The gateway node may sense that the node A has a downlink packet as a destination (S1310).

The gateway node determines whether the node A is included in the uplink record table of the gateway node (S1320). Here, as described above, the uplink recording table corresponds to information stored in the form of a list of nodes that have transmitted the uplink packet to the gateway node.

If the node A is included in the uplink recording table, the gateway node may set the "GRFlag" to "1", set the $C^P$ to "0", and then transmit the packet (S1330). Here, "GRFlag" and "$C^P$" may be included in the header of the packet (i.e., a packet header).

Here, the "GRFlag" indicates information indicating whether the gateway node has received the uplink packet from the node A or not. The fact that the value of "GRFlag" is set to "1" indicates that the gateway node has received the uplink packet from the node A, and the fact that the value of "GRFlag" is set to "0" indicates that the gateway node has never received the uplink packet from the node A.

The "$C^P$" means the cost of the packet. Since the cost required to transmit a packet from the gateway node to the gateway node is "0", the value of "$C^P$" is set to "0" in the gateway.

If the node A is not included in the uplink recording table, the gateway node may set the "GRFlag" to "0" and set the $C^P$ to "0", and then transmit the packet (S1340). At this time, the gateway node may transmit the packet by a flooding method.

The flow chart described above can be expressed in the form of an algorithm as shown in Table 1 below.

TABLE 1

| Algorithm The operation of the gateway node |
|---|
| Notations<br>   $UHT_{GATEWAY}$: The uplink history table of the gateway<br>   $C^P$: The cost value included in the packet P<br>Algorithm<br>  1: The gateway node has a downlink packet P destined to node A.<br>  2: if A ∈ $UHT_{GATEWAY}$ then<br>  3:   Transmit the packet with GRFlag = 1 and $C^P$ = 0<br>  4: else<br>  5:   Transmit the packet with GRFlag = 0 and $C^P$ = 0<br>  6: end if |

In addition, if the gateway node has several packets having the same destination, it can service the packet transmission through the downlink routing by requesting uplink packet transmission from the corresponding destination.

2) The Method of Servicing Downlink Traffic by a Node (e.g., a UE, Particularly a D2D UE or a V2X UE)

Figure 14:
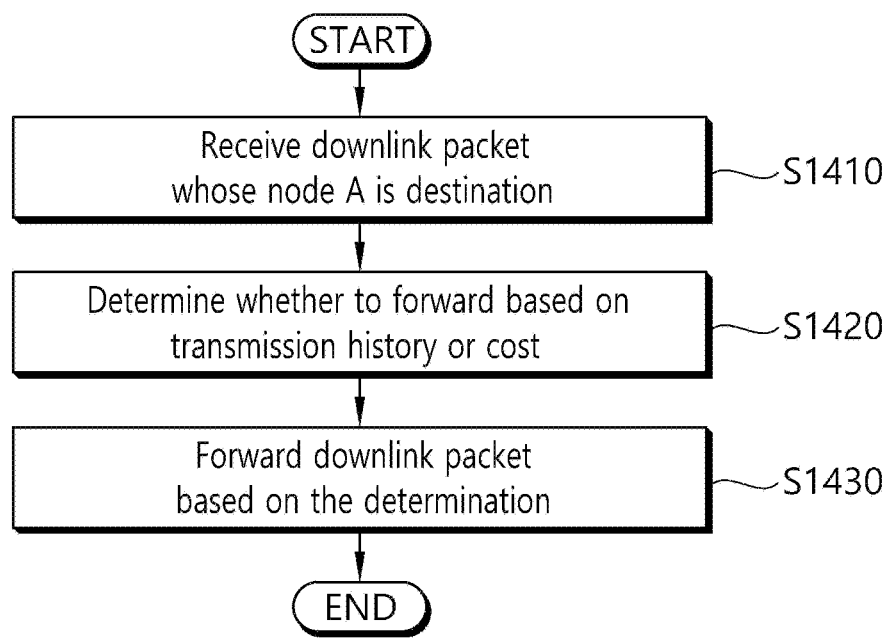
FIG. 14 is a flowchart of a method of transmitting a downlink packet performed by a node according to an embodiment of the present invention.

FIG. 14 is a flowchart of a method of transmitting a downlink packet performed by a node according to an embodiment of the present invention.

The node can receive the downlink packet, which is the destination of the node A (S1410). As described above, the node herein may mean a UE, and in particular, the node may correspond to a D2D UE or a V2X UE. That is, the embodiment according to the present invention can be applied in the D2D operation or the V2X operation.

The node may determine whether to forward the downlink packet based on the transmission history or the cost (S1420). The transmission history may refer to an uplink recording table of the node. Here, the uplink recording table may mean information stored in the form of a list of nodes that have transmitted the uplink packet to the node, as described above. A specific example in which the node forwards the downlink packet based on the transmission history or the cost will be described later.

Thereafter, the node may perform forwarding of the downlink packet based on the determination (S1430).

An example in which the node forwards the downlink packet based on the transmission history or the cost as described above may be as follows.

Figure 15:
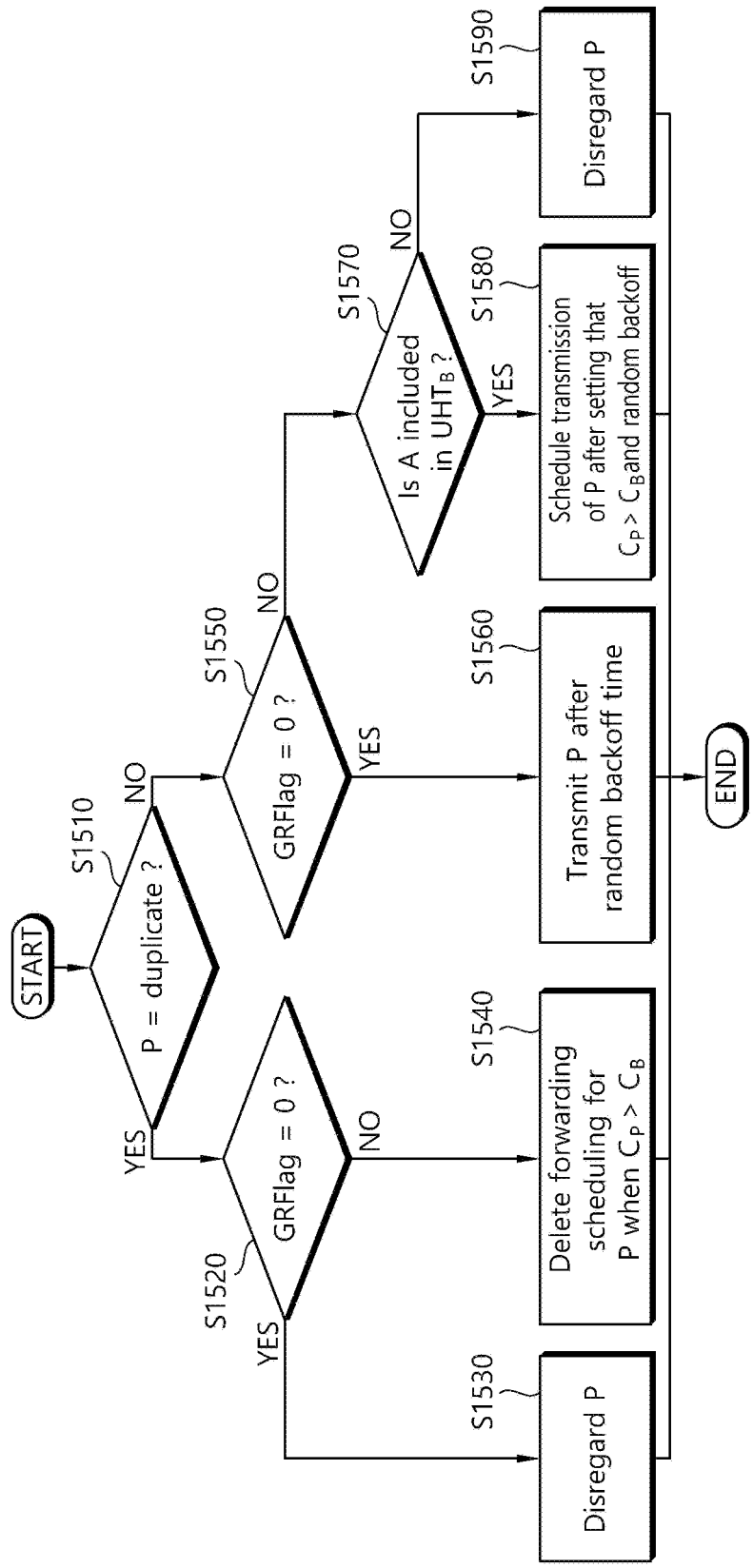
FIG. 15 is a flowchart of a downlink packet transmission method performed by a node according to another embodiment of the present invention.

FIG. 15 is a flowchart of a downlink packet transmission method performed by a node according to another embodiment of the present invention.

According to FIG. 15, the node determines whether the downlink packet "P" is a duplicate packet (i.e., "P=duplicate") (S1510).

If the downlink packet is a duplicate packet (i.e., "P=duplicate"), the node determines whether or not "GRFlag" is 0 (S1520).

Thereafter, if "GRFlag" is 0, the node may ignore the downlink packet (i.e., "P") (S1530). If "GRFlag" is not 0 (i.e., "GRFlag" is 1), the node can determine whether the $C^P$ value is greater than $C_B$, and if the $C^P$ is not greater than $C_B$, the node may delete the forwarding scheduling for the downlink packet (S1540). Here, $C^P$ denotes a cost included in the downlink packet, and $C_B$ denotes a cost from the node (i.e., the node receiving the downlink packet) to the gateway node.

If the downlink packet is not a duplicate packet, the node determines whether "GRFlag" is 0 (S1550).

Thereafter, when the value of "GRFlag" is 0, the node can transmit the downlink packet after the random backoff time (S1560).

If the value of "GRFlag" is not 0 (i.e., the value of "GRFlag" is 1), the node determines whether node A is included in the uplink recording table of the node (S1570).

At this time, if the node A is included in the uplink recording table of the node, the cost of the packet may be set to the cost of the node, and the transmission of the downlink packet may be scheduled after the random backoff (S1580). That is, the node receiving the downlink packet having the GRFlag of "1" can also decide to forward the packet including the cost to the gateway when the destination node is found by checking its UHT. Herein, if a node having a scheduled packet overhears a packet transmission of a node having a higher cost to a gateway, the node having the scheduled packet can cancel the scheduled forwarding.

The flow chart described above can be expressed as an algorithm type as shown in Table 2 below.

TABLE 2

Algorithm The operation of non-gateway nodes

Notations
   $UHT_v$: The uplink history table of node v
   $C^P$: The cost value included in the packet P
   $C_v$: The cost value of node v toward the gateway
Algorithm
  1: Node B receives a downlink packet P destined to node A.
  2: if P is duplicate then
  3:   if GRFlag == 0 then
  4:     Ignore P
  5:   else if GRFlag == 1 then
  6:     if $C^P > C_B$ then
  7:       Cancel the forwarding schedule for P if exist
  8:     end if
  9:   end if
10: else
11:   if GRFlag == 0 then
12:     Transmit P after random backoff time
13:   else if GRFlag = 1 then
14:     if $A \in UHT_B$ then
15:       Set $C^P$ as $C_B$
16:       Schedule the transmission of P after random backoff
17:     else
18:       Ignore P
19:     end if
20:   end if
21: end if The method for providing the uplink traffic service (i.e., uplink packet transmission or forwarding) and the downlink traffic service (i.e., downlink packet transmission or forwarding) based on the determined cost may be performed by the D2D UE or the V2X UE. At this time, when the UE (D2D UE or V2X UE) transmits an uplink packet or a downlink packet, it may include information on the maximum number of "hops" to which the packet can be transmitted. That is, the packet may be transmitted in an uplink or a downlink via a node (or router) as many times as the number indicated by the information.

Hereinafter, a concrete example of transmitting a packet including information on the maximum number of "hops" to which the packet can be transmitted will be described. In this case, although a method of including information on the maximum number of "hops" to which the packet can be transmitted is mainly described, the present method may be combined with (or applied to) the method of providing uplink traffic and downlink traffic service.

Figure 16:
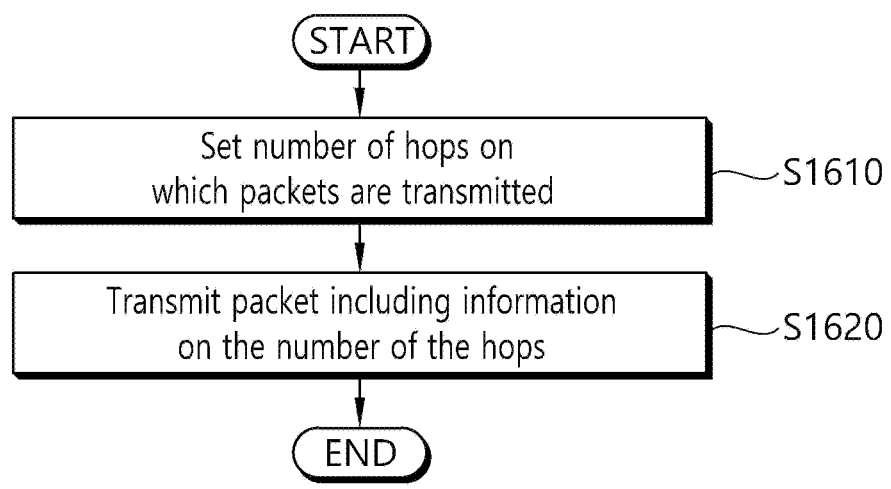
FIG. 16 is a flowchart of a method of transmitting a packet, based on information on the number of hops to which a packet is transmitted, according to an embodiment of the present invention.

FIG. 16 is a flowchart of a method of transmitting a packet, based on information on the number of hops to which a packet is transmitted, according to an embodiment of the present invention.

Referring to FIG. 16, the UE (D2D UE or V2X UE) can set the number of "hops" through which packets are transmitted (S1610). At this time, the number of hops can be preset in the UE, or can be set by an upper layer or a core.

At this time, the number of hops may have different values depending on the type of service of the packet.

For example, if the packet corresponds to a packet for an emergency call, it may be desirable for the packet to propagate as far as possible, so a higher value than a non-emergency call can be set. That is, when the packet corresponds to a packet for an emergency call, the packet can be propagated through a plurality of nodes (or a D2D UE or a V2X UE).

At this time, the number of hops may be determined according to the speed of the UE.

For example, if the UE is a V2X UE and the V2X UE is moving at a high speed, it may be desirable for the distant UEs to know that the V2X UE is moving at a high speed. Accordingly, the number of high hop counts can be set in a packet transmitted by a UE moving at a high speed compared with a packet transmitted by a UE moving at a relatively low speed.

Then, the UE can transmit a packet including information on the number of the configured hops (S1620). At this time, the packet may correspond to an uplink packet or a downlink packet. The information on the number of hops may correspond to information indicating up to how many nodes the packet transmitted by the UE can be propagated, as described above.

Although not shown in separate drawings, a UE receiving a packet including information on the number of hops may determine whether the packet has been transmitted to the UE (i.e., the UE receiving the packet) via the hops within the maximum number of hops through which the packet is transmitted. Thereafter, if the packet can be further transmitted, the UE (i.e., the UE receiving the packet) can additionally forward the packet. For example, the information included in the packet indicates that the packet can go through at most five hops, and if the packet is received by the UE through the fourth hop, the UE can additionally forward the packet.

The example of combination of the method of transmitting the information indicating the maximum number of hops with the method of providing the uplink traffic and the downlink traffic service based on the determined cost is as follows.

For example, when determining whether to forward the uplink packet, the node can determine whether to forward the uplink packet based on the information indicating the maximum number of hops included in the uplink packet. That is, when the uplink packet is transmitted within the maximum number of hops, the cost included in the packet may be compared with the cost of the node to determine whether to forward the uplink packet.

Also, for example, when determining whether to forward the downlink packet, the above-mentioned node can determine whether to forward the downlink packet based on the information indicating the maximum number of hops included in the downlink packet. That is, when the downlink packet is transmitted within the maximum number of hops, it is possible to determine whether to forward the downlink packet based on the transmission history or the cost.

According to the method of providing the uplink and/or downlink traffic service based on the determined cost, as in the above-described embodiments, the cost field destined for the gateway node is sequentially relayed to subcarriers independent of each other to be quickly and accurately formed. From the viewpoint of downlink routing (especially, gradient routing), the overhead for downlink cost management can be reduced by using the uplink transmission record and the uplink cost field simultaneously.

In addition, according to the present invention, it is possible to save time for updating the cost field of the network as compared with the conventional invention. In addition, the communication overhead allocated to the downlink service can be minimized by utilizing the uplink transmission recording table managed by each node. Finally, synchronization of the entire network can be achieved by predicting the period of the next tone signal occurring at the gateway.

Accordingly, the present invention can guarantee reliable uplink/downlink unicast packet transmission only with a small cost management overhead in a multi-hop wireless access network.

Figure 17:
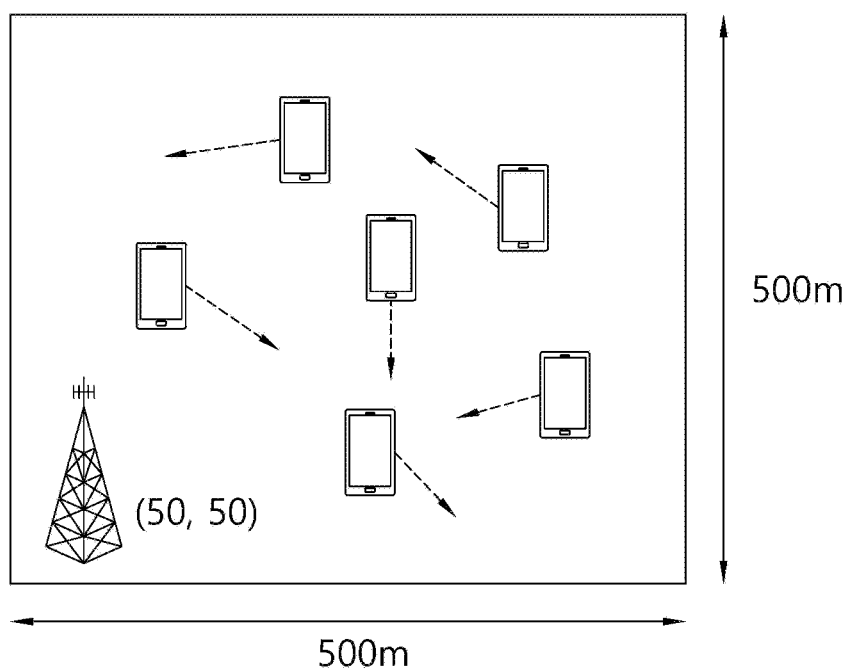
FIG. 17 is a schematic diagram illustrating a simulation environment to which an embodiment of the present invention is applied.

FIG. 17 is a schematic diagram illustrating a simulation environment to which an embodiment of the present invention is applied.

Referring to FIG. 17, it is assumed that there are one fixed gateway and 49 mobile nodes (i.e., UEs) in the simulation environment to which the present invention is applied.

Here, it is assumed that ten uplink sessions exist and ten downlink sessions exist. Hereinafter, the result of the experiment to which the embodiment of the present invention is applied is expressed as "Access-GRAD". In this simulation, the embodiments of the present invention and the schemes of "Oracle routing", "Original gradient routing", "AODV", "DSDV", "DSR", and "OLSR" have been compared from the perspective of the packet delivery ratio for the uplink/downlink traffic transmission.

"Oracle routing" is a method to calculate the minimum ETX (expected transmission count) route using global information. "Original gradient routing" is a method using the above-described gradient routing, which can be expressed as "E-GRAD" in the graph showing experimental results. In addition, "AODV", "DSDV", "DSR" and "OLSR" schemes correspond to the general hop-by-hop routing protocol method.

Figure 18:
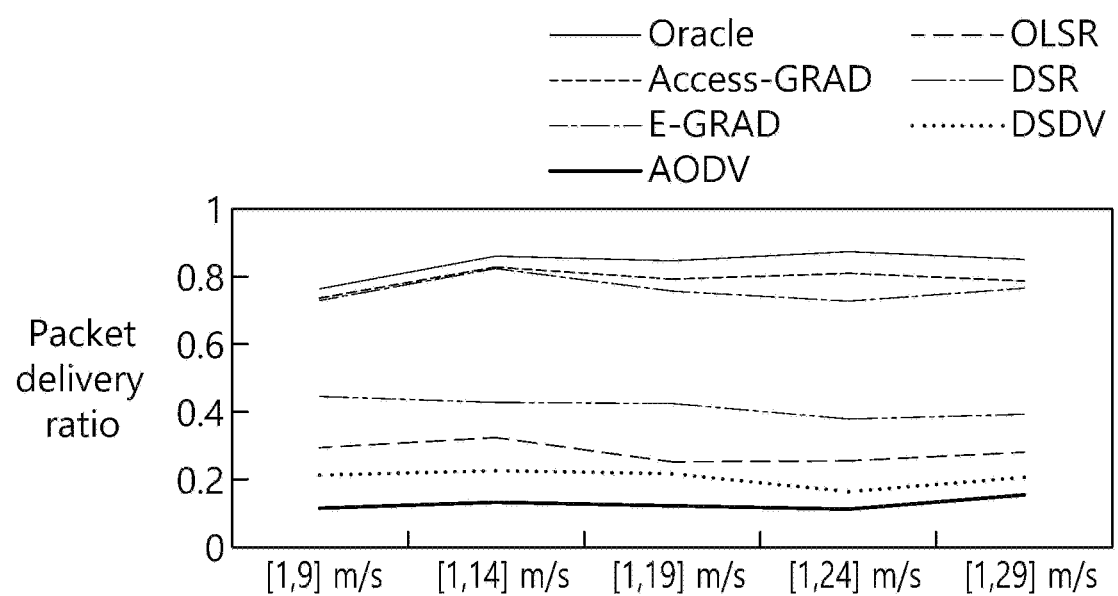
FIG. 18 is an experimental result of a packet delivery ratio for an uplink traffic transmission to which an embodiment of the present invention is applied.

FIG. 18 is an experimental result of a packet delivery ratio for an uplink traffic transmission to which an embodiment of the present invention is applied.

Referring to FIG. 18, the packet transmission ratio for uplink traffic transmission according to an embodiment of the present invention is higher than other methods. Particularly, as a result of the experiment, the packet delivery ratio for uplink traffic transmission according to the present invention converges to approximately 1, and most of the packets transmitted in the uplink can be transmitted to the gateway node.

Figure 19:
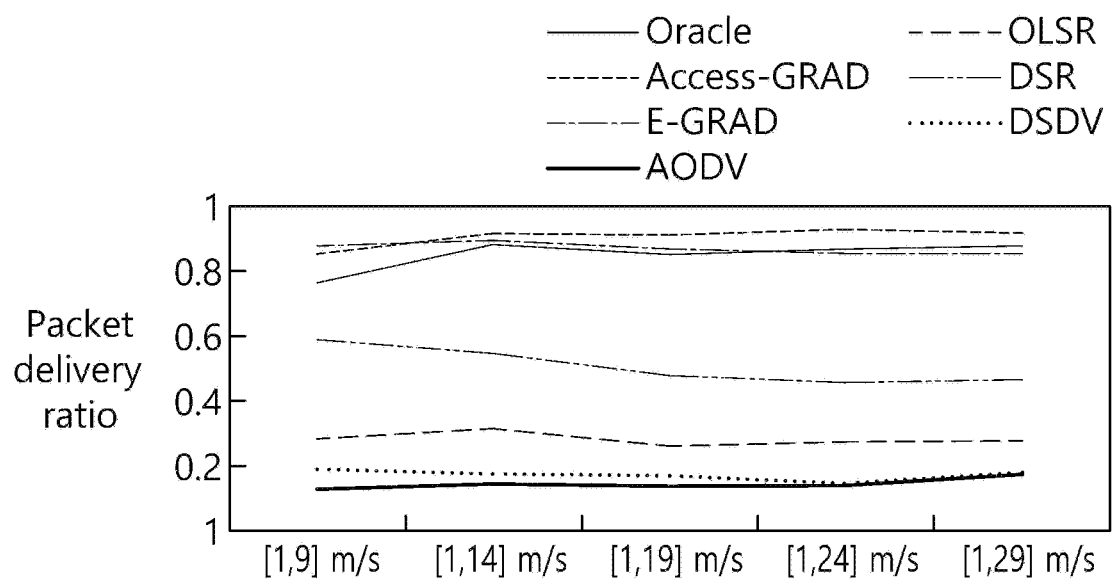
FIG. 19 is an experimental result of a packet delivery ratio for downlink traffic transmission to which an embodiment of the present invention is applied.

FIG. 19 is an experimental result of a packet delivery ratio for downlink traffic transmission to which an embodiment of the present invention is applied.

Referring to FIG. 19, the packet delivery ratio for downlink traffic transmission according to an embodiment of the present invention is higher than other methods. Especially, in case of having high node mobility, the efficiency of downlink traffic transmission according to the present invention is higher than other methods.

In addition, the convergence of the packet transmission ratio for the downlink traffic transmission according to the present invention to 1 means that most of the packets transmitted in the downlink are transmitted to the destination node.

Figure 20:
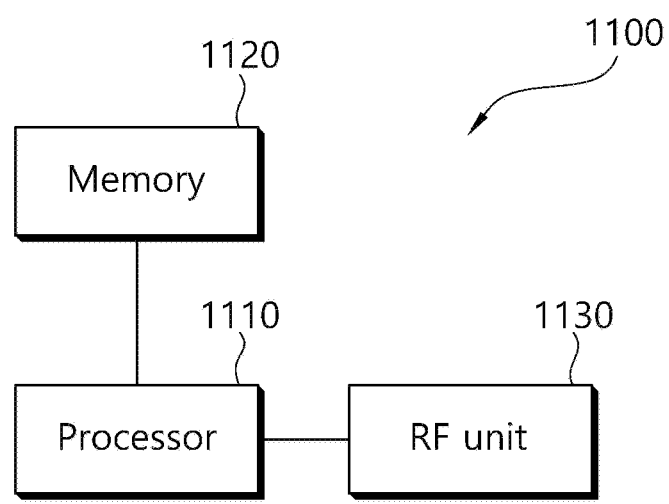
FIG. 20 is a block diagram showing a UE in which an embodiment of the present invention is implemented.

FIG. 20 is a block diagram showing a UE in which an embodiment of the present invention is implemented.

Referring to FIG. 20, a UE 1100 includes a processor 1110, a memory 1120, and a RF unit (radio frequency unit) 1130.

According to one embodiment, processor 1110 may receive a tone signal on subcarrier i (where i is a natural number). The processor 1110 may determine the cost value based on the index of the subcarrier and the signal-to-noise ratio of the tone signal. The processor 1110 may transmit the tone signal on an (i+1)th subcarrier.

According to another embodiment, the processor 1110 may receive an uplink packet. The processor 1110 may compare the cost included in the packet with the cost of the node to determine whether to forward the uplink packet. The processor 1110 may forward the uplink packet based on the determination.

According to another embodiment, the processor 1110 may receive a downlink packet of which the destination is node A. The processor 1110 may determine whether to forward the downlink packet based on the transmission history or the cost. The processor 1110 may perform forwarding for the downlink packet based on the determination.

According to further another embodiment, the processor 1110 may set the number of "hops" to which a packet is to be transmitted. The processor 1110 may transmit a packet including information on the set number of hops.

The RF unit 1130 is connected to the processor 1110 to transmit and receive radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for forwarding an uplink packet, in a wireless communication system, the method performed by a first user equipment (UE) which supports a vehicle-to-X (V2X) and comprising:

receiving, from a second UE, the uplink packet including a first cost;

determining whether to forward the uplink packet by comparing the first cost with a second cost corresponding to a cost of the first UE; and forwarding, to a third UE, the uplink packet based on the determination, wherein if a value of the second cost is smaller than a value of the first cost, the first UE forwards the uplink packet, and if the value of the second cost is not smaller than the value of the first cost, the first UE does not forward the uplink packet, wherein the second cost is determined based on a subcarrier index value of a first tone signal transmitted from the second UE and a signal-to-noise ratio of the first tone signal, wherein the value of the second cost when the signal-to-noise ratio of the first tone signal is greater than a preset threshold value is greater than the value of the second cost when the signal-to-noise ratio of the first tone signal is not greater than the preset threshold value, wherein the value of the second cost when the signal-to-noise ratio of the first tone signal is greater than the preset threshold value is determined by an equation:

$$C_A=(i-1)\times SNR_{THRES}+1,$$

wherein $C_A$ is a value of the determined second cost, i is the subcarrier index value, and $SNR_{THRES}$ is the preset threshold value, wherein the value of the second cost when the signal-to-noise ratio of the first tone signal is not greater than the preset threshold value is determined by an equation:

$$C_A=(i-1)\times SNR_{THRES}+\lceil SNR_{THRES}+1-SNR_{TONE}\rceil,$$

wherein $C_A$ is a value of the determined second cost, i is the subcarrier index value, $SNR_{THRES}$ is the preset threshold value, and $SNR_{TONE}$ is the signal-to-noise ratio of the first tone signal, wherein the uplink packet further includes information on a maximum number of nodes through which the uplink packet may be forwarded, wherein when the first UE transmits a second tone signal to the third UE, the first UE transmits the second tone signal on a subcarrier having a subcarrier index value (i+1), when the value of the second cost is smaller than the value of the first cost, and wherein the first UE transmits the second tone signal to the third UE during a short inter-frame space.

2. A first user equipment (UE), which supports a vehicle-to-X (V2X), comprising:

a transceiver configured to transmit and receive a wireless signal; and a processor coupled with the transceiver, wherein the processor is configured to:

control the transceiver to receive, from a second UE, an uplink packet including a first cost;

determine whether to forward the uplink packet by comparing the first cost with a second cost corresponding to a cost of the first UE; and control the transceiver to forward, to a third UE, the uplink packet based on the determination, wherein if a value of the second cost is smaller than a value of the first cost, the first UE forwards the uplink packet, and if the value of the second cost is not smaller than the value of the first cost, the first UE does not forward the uplink packet, wherein the second cost is determined based on a subcarrier index value of a first tone signal transmitted from the second UE and a signal-to-noise ratio of the first tone signal, wherein the value of the second cost when the signal-to-noise ratio of the first tone signal is greater than a preset threshold value is greater than the value of the second cost when the signal-to-noise ratio of the first tone signal is not greater than the preset threshold value, wherein the value of the second cost when the signal-to-noise ratio of the first tone signal is greater than the preset threshold value is determined by an equation:

$$C_A=(i-1)\times SNR_{THRES}+1,$$

wherein $C_A$ is a value of the determined second cost, i is the subcarrier index value, and $SNR_{THRES}$ is the preset threshold value, wherein the value of the second cost when the signal-to-noise ratio of the first tone signal is not greater than the preset threshold value is determined by an equation:

$$C_A=(i-1)\times SNR_{THRES}+\lceil SNR_{THRES}+1-SNR_{TONE}\rceil,$$

wherein $C_A$ is a value of the determined second cost, i is the subcarrier index value, $SNR_{THRES}$ is the preset threshold value, and $SNR_{TONE}$ is the signal-to-noise ratio of the first tone signal, wherein the uplink packet further includes information on a maximum number of nodes through which the uplink packet may be forwarded, wherein when the first UE transmits a second tone signal to the third UE, the first UE transmits the second tone signal on a subcarrier having a subcarrier index value (i+1), when the value of the second cost is smaller than the value of the first cost, and wherein the first UE transmits the second tone signal to the third UE during a short inter-frame space.

* * * * *